US010220496B2

(12) United States Patent
Saftoiu

(10) Patent No.: US 10,220,496 B2
(45) Date of Patent: Mar. 5, 2019

(54) REACTION DEVICE FOR REDUCING STRESS ON TORQUE GENERATING TOOLS

(71) Applicant: Torq Fusion LLC, Landing, NJ (US)

(72) Inventor: Radu Saftoiu, Landing, NJ (US)

(73) Assignee: TORQ FUSION LLC, Landing, NJ (US)

( * ) Notice: Subject to any disclaimer, the term of this patent is extended or adjusted under 35 U.S.C. 154(b) by 735 days.

(21) Appl. No.: 14/695,885

(22) Filed: Apr. 24, 2015

(65) Prior Publication Data

US 2015/0231772 A1   Aug. 20, 2015

Related U.S. Application Data

(63) Continuation of application No. 14/514,457, filed on Oct. 15, 2014, now Pat. No. 9,016,173.

(Continued)

(51) Int. Cl.

| B25B 21/00 | (2006.01) |
|---|---|
| B25B 23/00 | (2006.01) |
| B25F 5/02 | (2006.01) |
| F16D 1/02 | (2006.01) |
| F16H 1/34 | (2006.01) |
| B25B 15/04 | (2006.01) |
| B25H 1/00 | (2006.01) |
| B25B 13/46 | (2006.01) |
| B23P 19/06 | (2006.01) |
| B25B 21/02 | (2006.01) |

(Continued)

(52) U.S. Cl.
CPC .......... *B25B 23/0078* (2013.01); *B25B 21/00* (2013.01); *B25B 21/005* (2013.01); *B25B 23/0035* (2013.01); *B25F 5/028* (2013.01); *F16D 1/02* (2013.01); *F16H 1/34* (2013.01); *B23P 19/06* (2013.01); *B25B 13/466* (2013.01); *B25B 15/04* (2013.01); *B25B 21/004* (2013.01); *B25B 21/023* (2013.01); *B25H 1/0021* (2013.01); *F16B 2200/10* (2018.08); *F16D 1/101* (2013.01); *F16D 2001/103* (2013.01); *F16H 2001/289* (2013.01); *Y10T 403/7039* (2015.01)

(58) Field of Classification Search
CPC ....... B23P 19/06; B25B 13/466; B25B 21/00; B25B 21/004; B25B 21/005; B25B 21/023; B25B 23/0035; B25B 23/0078; B25F 5/028; B25H 1/0021; F16D 1/02; F16D 1/101; F16D 2001/103; F16H 1/34; F16H 2001/289; Y10T 403/7039
USPC ......................................................... 81/57.4
See application file for complete search history.

(56) References Cited

U.S. PATENT DOCUMENTS

| 2,893,278 A * | 7/1959 | Rice ................ B25B 23/0078 192/43.1 |
| 3,830,119 A * | 8/1974 | Travis .................... B25B 17/02 81/477 |

(Continued)

*Primary Examiner* — Joseph J Hail
*Assistant Examiner* — Arman Milanian
(74) *Attorney, Agent, or Firm* — Michael J. Feigin, Esq.; Feigin and Fridman LLC

(57) ABSTRACT

A reaction arm for use with a torque generating device, the reaction arm including a reaction bar, and a body portion having a first internal diameter, and having formed on an internal surface thereof a female spline having a second internal diameter and a guide bushing having a third internal diameter, the first, second, and third internal diameter being distinctly sized.

11 Claims, 4 Drawing Sheets

Related U.S. Application Data

(60) Provisional application No. 61/892,130, filed on Oct. 17, 2013.

(51) Int. Cl.
*F16H 1/28* (2006.01)
*F16D 1/10* (2006.01)

(56) References Cited

U.S. PATENT DOCUMENTS

| | | | |
|---|---|---|---|
| 3,964,347 A | 6/1976 | Ahlen | |
| 4,155,278 A * | 5/1979 | Estok | B25B 21/00 81/57.11 |
| 4,418,590 A * | 12/1983 | Dubiel | B25B 23/1456 81/467 |
| 4,462,282 A * | 7/1984 | Biek | B25B 21/00 173/181 |
| 4,484,871 A * | 11/1984 | Adman | B25B 21/008 173/177 |
| 4,513,827 A * | 4/1985 | Dubiel | B25B 21/008 173/178 |
| 5,176,588 A | 1/1993 | Sackschewsky | |
| 5,209,701 A * | 5/1993 | Ishikawa | B60B 27/0005 301/105.1 |
| 5,211,080 A | 5/1993 | Leising et al. | |
| 5,429,017 A * | 7/1995 | Junkers | B25B 21/004 81/57.4 |
| 5,513,546 A * | 5/1996 | Ikeda | B25B 21/00 74/378 |
| 6,053,080 A * | 4/2000 | Kaneyama | B25B 23/0078 81/469 |
| 6,458,058 B1 * | 10/2002 | Fu | F16H 1/34 475/331 |
| 6,612,959 B2 | 9/2003 | Frost | |
| 6,849,023 B1 | 2/2005 | Kerr | |
| 7,275,450 B2 * | 10/2007 | Hirai | B25B 21/00 73/862.21 |
| 7,287,621 B2 | 10/2007 | Kuroki et al. | |
| 7,481,281 B2 | 1/2009 | Schuaf | |
| 7,524,261 B1 | 4/2009 | Osborn | |
| 7,654,339 B2 * | 2/2010 | Fuchs | B23B 39/14 173/128 |
| 7,832,310 B2 * | 11/2010 | Junkers | B25B 21/00 81/52 |
| 8,192,322 B2 | 6/2012 | Van Bogaert et al. | |
| 8,403,788 B2 | 3/2013 | Janson et al. | |
| 8,622,869 B2 | 1/2014 | Mourani | |
| 8,646,589 B2 | 2/2014 | Janson et al. | |
| 2003/0136229 A1 * | 7/2003 | Junkers | B25B 21/005 81/57.39 |
| 2005/0279198 A1 * | 12/2005 | Kushida | B25B 21/00 81/469 |
| 2006/0005637 A1 * | 1/2006 | Hirai | B25B 21/00 73/862.21 |
| 2007/0056408 A1 * | 3/2007 | Knopp | B25B 21/00 81/57 |
| 2008/0098863 A1 * | 5/2008 | Kaneyama | B23P 19/066 81/468 |
| 2009/0107297 A1 * | 4/2009 | Junkers | B25B 21/008 81/57.39 |
| 2009/0107305 A1 * | 4/2009 | Junkers | B25B 21/005 81/473 |
| 2009/0188353 A1 * | 7/2009 | Junkers | B25B 21/008 81/473 |
| 2013/0074315 A1 * | 3/2013 | Slocum | B25B 23/00 29/525.01 |
| 2013/0104702 A1 * | 5/2013 | Hellstrom | B25B 23/0078 81/54 |
| 2013/0161041 A1 * | 6/2013 | Junkers | B25B 21/02 173/48 |

* cited by examiner

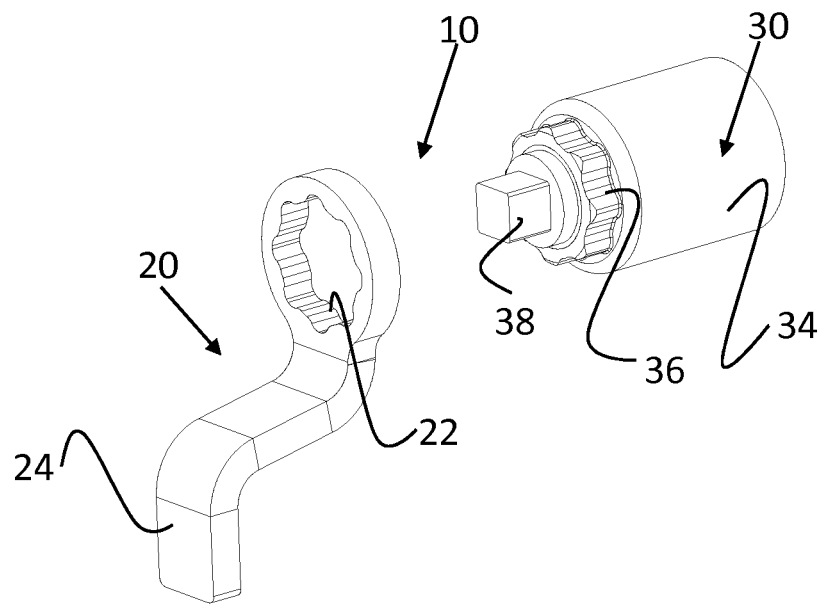
FIGURE 1A – PRIOR ART
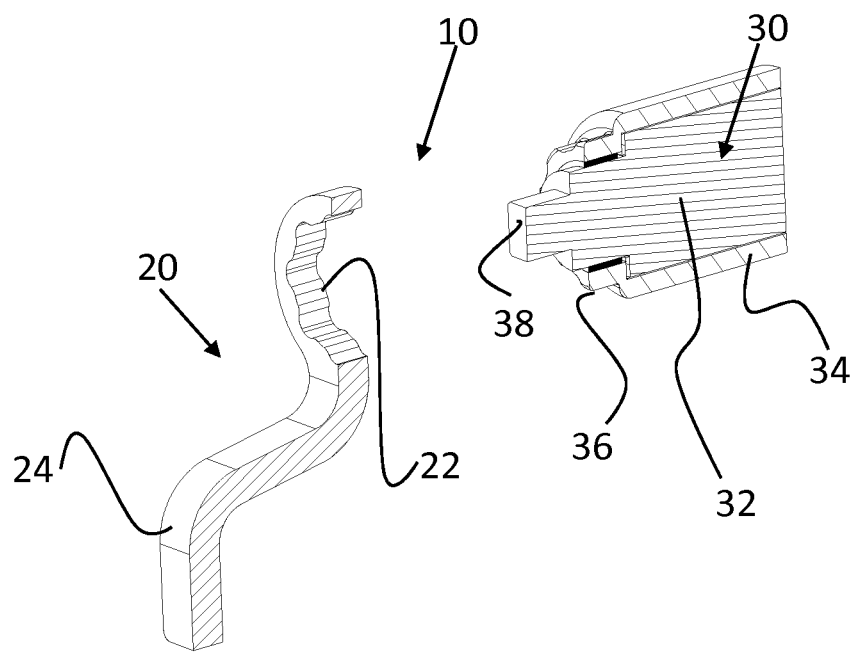
FIGURE 1B – PRIOR ART

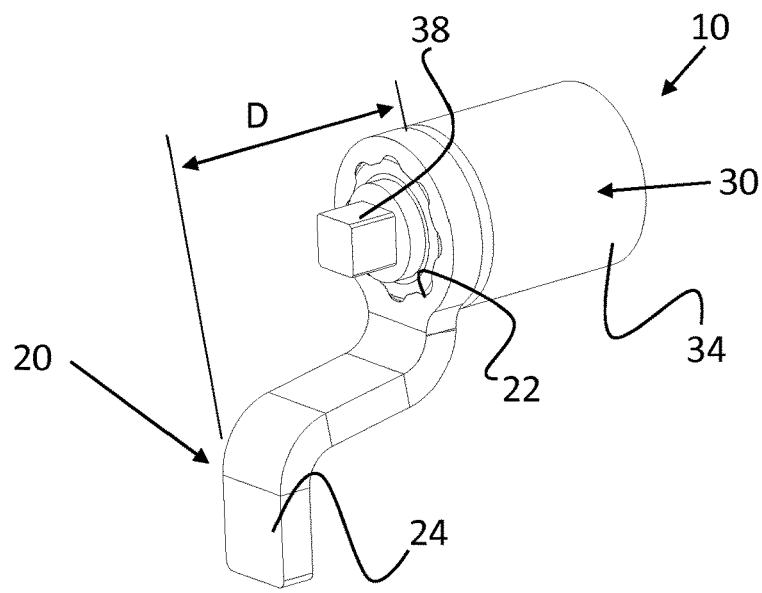
FIGURE 2A – PRIOR ART
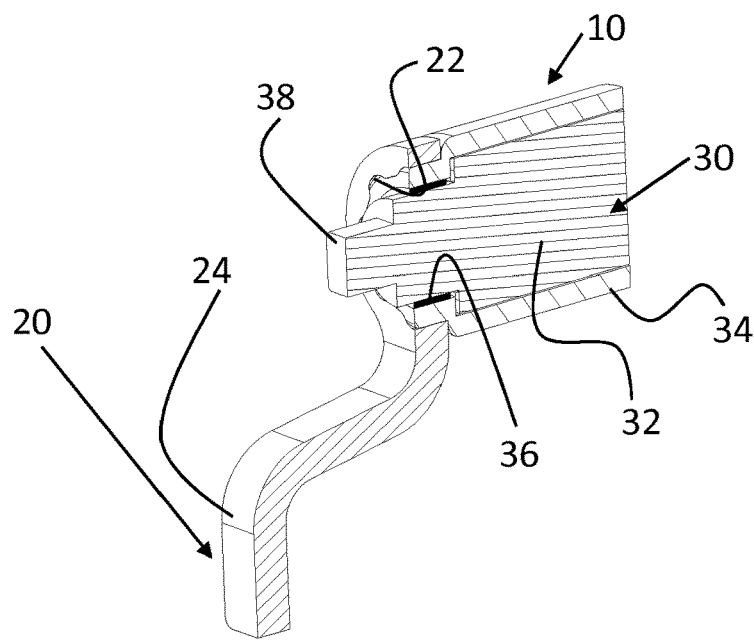
FIGURE 2B – PRIOR ART

REACTION DEVICE FOR REDUCING STRESS ON TORQUE GENERATING TOOLS

BACKGROUND OF THE DISCLOSED TECHNOLOGY

Torque reaction devices and arms are designed to be used with torque generating devices or tools to transfer the reaction torque from the device or tool to the designated reaction point and to protect the operator from said reaction torque; overall they prevent rotation of the tool about itself. Typical reaction devices of the prior art are mounted on a small spline-like portion of the torque generating device. As a result, unwanted stress from the side load generated are applied to the torque generating device, causing slight deformation of the torque generating device which leads to great wear and reduction in performance of the torque generating device.

In some prior art devices, there is a distance between a point acting as a pivot point of the reaction arm and the point of reaction where the reaction force is applied. In such cases, an unwanted moment occurs between the reaction arm and torque generating device, when in use. This unwanted moment often creates an angular misalignment between the reaction arm and the torque generating device, which may in turn cause side forces which may actually slightly deform a portion of the torque generating device. Additionally, the unwanted moment and side forces waste energy which fails to go into operating the torque generating device and instead cause significant wear on the device.

There is thus a need in the art for a reaction arm which prevents annular misalignment between the reaction arm and the torque generating device and which directs all the energy generated by the device to the work area requiring the torque.

U.S. Pat. No. 8,192,322 to Van Bogaert et al discloses a wind turbine drive which is formed of a rotor with a rotor shaft and of a transmission box with a planetary gear unit. The transmission box is provided with a reaction arm which transmits a reaction torque around the rotary shaft from the transmission box to the nacelle so as to prevent the transmission box from turning along with the rotor shaft. It appears that this reference discloses a reaction arm preventing rotation of a transmission gear. However the reaction arm does not surround a significant part of the gear box.

U.S. Pat. No. 8,646,589 to Janson et al discloses a transmission latching mechanism including a component of a transmission gear-set. Two non-rotating housing components which surround a large part of the gear box comprise a reaction component. However, it appears that the reaction device in this case does not comprise a reaction arm per se, and does not prevent annular misalignment between the gear box and the reaction component.

U.S. Patent Application Publication 2013/0324344 to Pohl et al discloses continuously variable transmission devices and systems, including a torque governor comprising two reaction arms. The reaction arms assist the torque governor in adjusting the transmission speed ratio to maintain a constant operating torque. However, two reaction arms are required for operation of the disclosed device, and neither of the reaction arms engages a large portion of the device.

SUMMARY OF THE DISCLOSED TECHNOLOGY

The disclosed technology described herein addresses a need, unfulfilled in the prior art, for providing a reaction device, including: a head of a torque generating device comprising an output shaft including a drive connector, an optional external guide bushing engagement surface formed on the exterior of a portion of the output shaft, an external male spline formed on the exterior of a portion of the housing, and a housing portion formed around a portion of the output shaft excluding the external guide bushing engagement surface and the male spline; and a reaction arm including a reaction bar and a body portion including an internal female spline and a guide bushing, wherein the body portion of the reaction arm wraps around the head of the torque generating device, such that an internal surface of the body portion engages the housing portion of the torque generating device, the female spline engages the male spline, and the guide bushing engages the guide bushing engagement surface.

In some embodiments, the reaction bar and the body portion of the reaction arm, including the internal female spline and the guide bushing, form a unitary structure. In some such embodiments, engagement of the unitary structure with the head of the torque generating device prevents annular misalignment between the reaction arm and the head of the torque generating device.

In some embodiments, the external guide bushing engagement surface has a first external diameter, the male spline has a second external diameter, and the housing portion has a third external diameter, the guide bushing has a first internal diameter corresponding to the first external diameter, the female spline has a second internal diameter corresponding to the second external diameter, and the body portion of the reaction arm has a third internal diameter corresponding to the third external diameter, and the first, second, and third internal diameters are distinctly sized.

In some embodiments, a length of an engagement area of the head of the torque generating device and the reaction arm is sufficiently large to ensure that all reactive torque forces generated by the torque generating device are transmitted onto the reaction arm.

In some embodiments, a majority of the external surfaces of the head of the torque generating device engage internal surface of the reaction arm.

In accordance with an aspect of some embodiments of the disclosed technology there is also provided a reaction arm for use with a torque generating device, the reaction arm including a reaction bar, and a body portion having a first internal diameter, and having formed on an internal surface thereof a female spline having a second internal diameter and a guide bushing having a third internal diameter, the first, second, and third internal diameter being distinctly sized.

In some embodiments, the reaction bar, the body portion, the female spline, and the guide bushing form a unitary structure.

In some embodiments, the body portion is configured to wrap around a head portion of a torque generating device, such that the majority of the surface of the head portion engages internal surfaces of the reaction arm.

In some embodiments, the body portion is configured to wrap around a head portion of a torque generating device, such that the guide bushing engages a guide bushing engagement surface of the torque generating device output shaft, the female spline engages a male spline of the torque generating device, and an internal surface of the body portion having the first internal diameter engaging a housing portion of the torque generating device.

BRIEF DESCRIPTION OF THE DRAWINGS

FIGS. 1A and 1B respectively show a perspective view and a sectional view of a reaction device according to the prior art, when unassembled.

FIGS. 2A and 2B respectively show a perspective view and a sectional view of a reaction device according to the prior art, when assembled.

DETAILED DESCRIPTION OF EMBODIMENTS OF THE DISCLOSED TECHNOLOGY

Figure 3A:
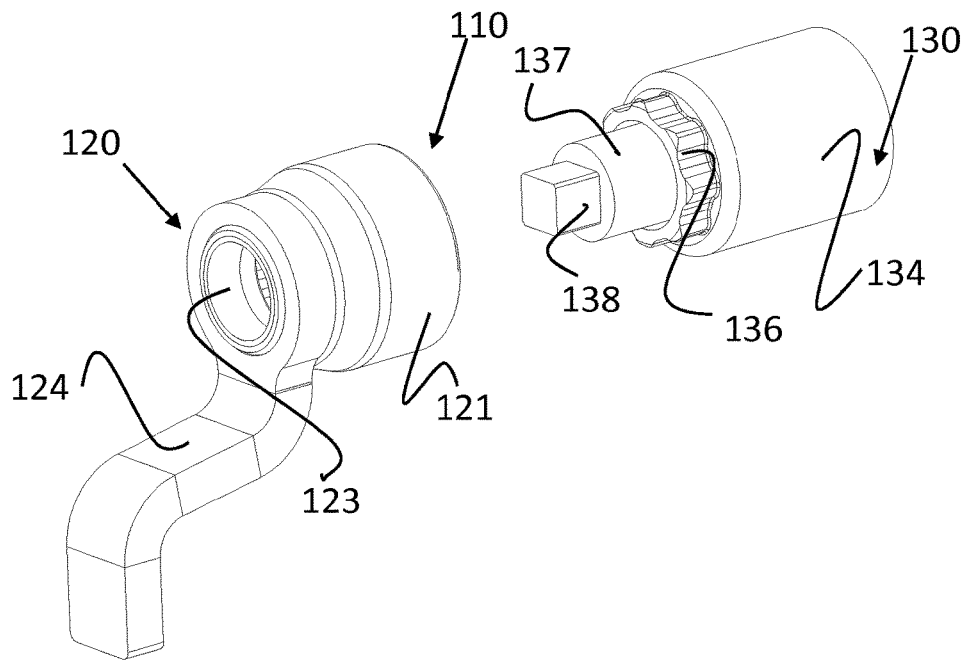
FIGS. 3A and 3B respectively show a perspective view and a sectional view of a reaction device according to an embodiment of the disclosed technology, when unassembled.

The presently disclosed technology is directed towards a reaction device or a reaction arm for use with a torque generating device, which reaction device wraps around a significant portion of the torque generating device, and specifically wraps around an area corresponding to three distinctly sized internal diameters of the torque generating device, while preventing annular misalignment between the reaction device and the torque generating device.

FIGS. 1A and 1B respectively show a perspective view and a sectional view of a reaction device 10 according to the prior art, when unassembled. As seen, the reaction device 10 includes a reaction arm 20 designed to engage a torque generating device 30, here shown as a torque wrench. The reaction arm 20 includes a female spline 22 and a reaction bar 24.

The torque wrench 30 includes an output shaft 32, a torque wrench body 34, and a male spline 36, as well as a drive connector 38, here shown as a square drive connector, configured to connect to another portion of the torque wrench (not shown). Female spline 22 of the reaction arm 20 is designed to engage male spline 36 of the torque wrench 30, such that action carried out by the operator on reaction bar 24 is transferred via female spline 22 and male spline 36 to torque wrench 30, and is converted into rotational motion therein. Typically, the output shaft 32 rotates through a guide bushing (unlabeled) forming part of torque wrench 30.

Reference is now made to FIGS. 2A and 2B, which respectively show a perspective view and a sectional view of the reaction device 10 according to the prior art, when assembled. As seen, female spline 22 of reaction arm 20 engages male spline 36 of torque wrench 30. The reaction arm 20 may abut against a stationary device, to prevent the entire torque wrench 30 from rotating while being used. The engagement of the male spline 36 and female spline 22 further keeps the reaction arm 20 from rotating with respect to the torque wrench 30.

In some uses of the torque wrench 30, the reaction arm may abut against a nut or bolt, so that when rotational forces are applied as the torque wrench 30 is being used, the reaction arm 20 prevents the torque wrench from spinning about its own axis, thus causing the rotational forces to act on the desired device (here, a nut which is under the torque wrench device).

When reaction device 10 is in use, torque is applied to reaction arm 20. A distance, indicated by D, exists between the engagement of splines 22 and 36, which acts as a pivot point, and the point of reaction on reaction arm 20 where the reaction force is applied. As such, in prior art devices, an unwanted moment occurs between the reaction arm 20 and torque wrench 30, when in use. This moment often creates an angular misalignment between the reaction arm 20 and torque wrench 30, which in turn often causes side forces to be applied to the torque wrench body 34, which may actually slightly deform the torque wrench body 34. Additionally, the side forces applied to body 34 comprise wasted energy which fails to go into turning the nut or other fastener being acted upon by torque wrench 30. Additionally, the unwanted moment between the reaction arm 20 and the torque wrench 30 may deform a portion of the torque wrench 30 which contains the guide bushing, acting as a brake on the drive connector 3.

Figure 3B:
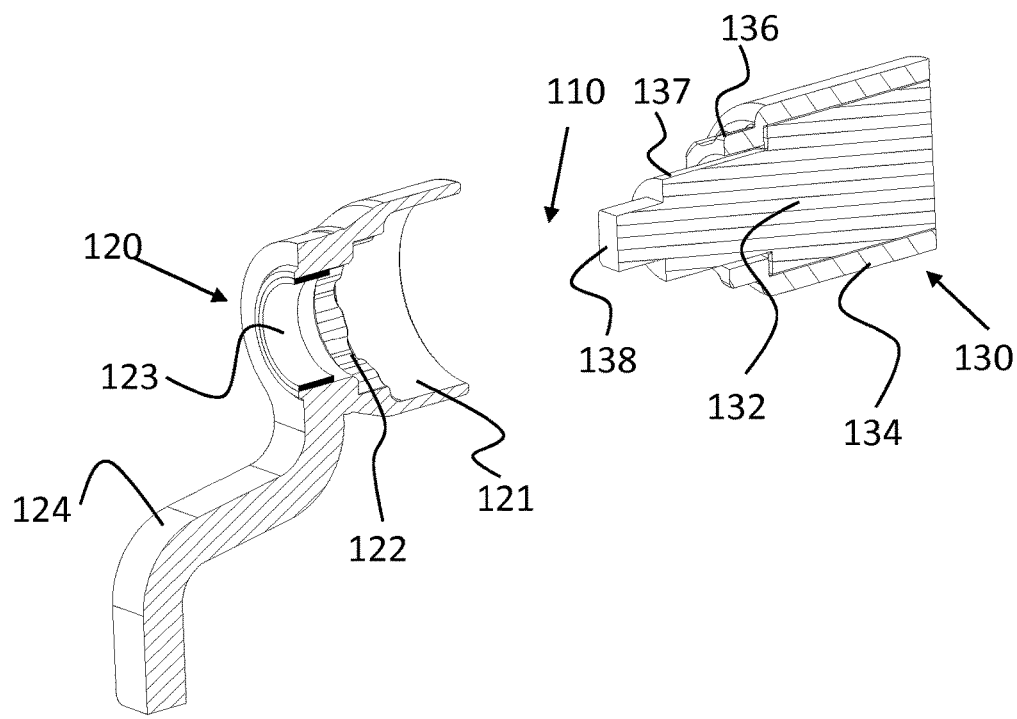

FIGS. 3A and 3B respectively show a perspective view and a sectional view of a reaction device 110 according to an embodiment of the disclosed technology, when unassembled. As seen, the reaction device 110 includes a reaction arm 120 designed to engage a torque generating device 130, here shown as a torque wrench.

The reaction arm 120 includes a support cup 121, having a female spline 122 and an optional guide bushing 123 formed on an interior surface of the support cup 121. Reaction arm 120 further includes a reaction bar 124. It is a particular feature of the disclosed technology that support cup 121, guide bushing 123, and female spline 122 are integrally formed and form a unitary structure, having three distinctly sized internal diameters.

The torque wrench 130 includes an output shaft 132 enclosed in a torque wrench body 134. The torque wrench body 134 defines a male spline 136, configured to engage female spline 122 of the reaction arm 120. On the exterior thereof, output shaft 132 includes an optional guide bushing engagement surface 137 for engagement with guide bushing 123 of reaction arm 120. Output shaft 132 further includes a drive connector 138, here shown as a square drive connector, configured to connect to another portion of the torque wrench (not shown).

It is a particular feature of the disclosed technology that torque wrench body 134, male spline 136, and guide bushing engagement surface 137 have three distinctly sized exterior diameters, sized to engage the three distinctly sized interior diameters of reaction arm 120.

Figure 4A:
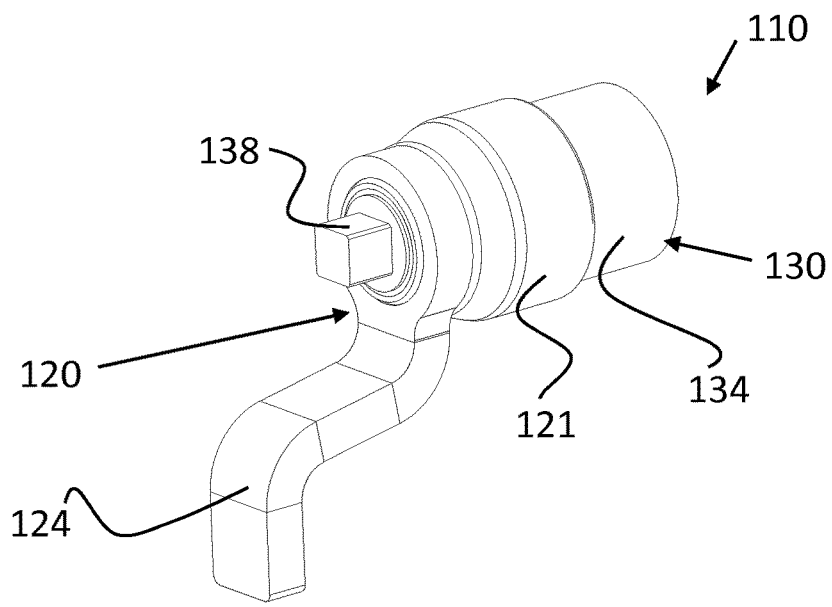
FIGS. 4A and 4B respectively show a perspective view and a sectional view of a reaction device according to an embodiment of the disclosed technology, when assembled.
Figure 4B:
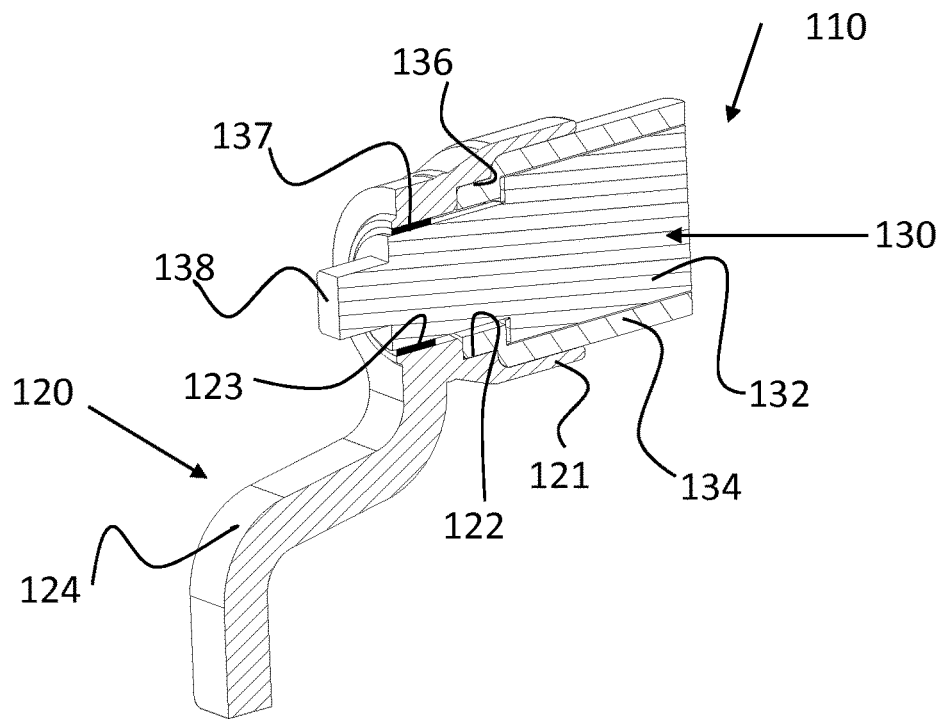

FIGS. 4A and 4B respectively show a perspective view and a sectional view of the reaction device 110 according to an embodiment of the disclosed technology, when assembled. As seen, reaction arm 120 wraps around an exterior of torque wrench 130, such that an inner surface of support cup 121 engages torque wrench body 134, female spline 122 of reaction arm 120 engages male spline 136 of torque wrench 130, and guide bushing 123 of the reaction arm 120 engages guide bushing engagement surface 137 of torque wrench 130.

Similar to the functionality of the reaction device of the prior art, the reaction arm 120 may abut against a stationary device, to prevent the entire torque wrench 130 from rotating while being used. The respective engagement between inner surfaces 121, 122, and 123 of the reaction arm 120 and surfaces 134, 136, and 137 of the torque wrench 130 further keep the reaction arm 120 from rotating with respect to the torque wrench 130. Additionally, In some uses of the torque wrench 130, the reaction arm 120 may abut against a nut or bolt, so that when rotational forces are applied as the torque wrench 130 is being used, the reaction arm 120 prevents the torque wrench from spinning about its own axis, thus causing the rotational forces to act on the desired device (in this case, a nut which is under the torque wrench device).

It is a particular feature of the disclosed technology that the unitary structure formed by support cup 121, female guide 122, and guide bushing 123 prevents angular misalignment between the reaction arm 120 and torque wrench 130, and specifically square drive connector 138, which in prior art devices is created from unwanted moment between the components. In the prior art, guide busings are typically only found in the torque wrench. Incorporation of guide bushing 123, instead or additionally into the reaction arm 120 results in the reaction arm guiding the output shaft 132 thus further minimizing angular misalignment between the reaction arm 120 and drive connector 138 of torque wrench 130.

It is a further feature of the disclosed technology that female spline 122, located on the interior of reaction arm 120 and unitarily attached to support cup 121, engages corresponding male spline 136 of the torque wrench 130. This spline engagement extends the length of the engagement surface between the reaction arm 120 and torque wrench 130, ensuring that all reactive torque forces generated by the torque wrench 130 are transmitted onto the reaction arm 120 abutted against a stationary device, to prevent the torque wrench 130 from rotating while being used while also ensuring that all force generated by the torque wrench is used for operation of the torque wrench 130 and reducing stress and wear on components of the torque wrench 130 and of the reaction arm 120.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods, systems, and devices described herein above are also contemplated and within the scope of the invention.

I claim:

1. A reaction arm for use with a torque generating device, the reaction arm comprising:
   a body portion having a first internal diameter and a first exterior diameter;
   at least a second element extending longitudinally from said body portion and having a second internal diameter, wherein said second element includes an internal female spline which engages a male spline of the torque generating device, and an internal surface of said body portion having said first internal diameter engaging a housing portion of said torque generating device, wherein said female spline and male spine prevent the reaction arm from rotating with respect to said torque generating device; and
   a third element including a reaction bar and a guide bushing, said third element extending longitudinally from said second element, said guide bushing having a third internal diameter, and said third element having a third exterior diameter smaller than said first exterior diameter,
   said first, second, and third internal diameter being distinctly sized, and
   said second element having an exterior surface tapering from said first exterior diameter to said third exterior diameter.

2. The reaction arm of claim 1, wherein said reaction bar, said body portion and said guide bushing form a unitary structure.

3. The reaction arm of claim 1, wherein said body portion is configured to wrap around a head portion of a torque generating device.

4. The reaction arm of claim 1, wherein said body portion is configured to wrap around a head portion of a torque generating device, such that said guide bushing engages a guide bushing engagement surface of the torque generating device.

5. A reaction device, comprising:
   a head of a torque generating device; and
   a reaction arm connectable to said head of said torque generating device,
   said reaction arm comprising:
      a reaction bar; and
      a body portion including an internal female spline, wherein said internal female spline engages a male spline of said torque generating device, and an internal surface of said body portion having a first internal diameter engages a housing portion of said torque generating device, wherein said female spline and said male spine prevent the reaction arm from rotating with respect to said torque generating device;
   wherein said body portion of said reaction arm wraps around said head of said torque generating device, such that an internal surface of said body portion engages a housing portion of said torque generating device, and said female spline engages an external male spline disposed on an exterior of said housing portion.

6. The reaction device of claim 5, further comprising an output shaft including a drive connector; and
   wherein said reaction bar and said body portion of said reaction arm, including said internal female spline, form a unitary structure.

7. The reaction device of claim 5, wherein engagement of said unitary structure with said head of said torque generating device prevents annular misalignment between said reaction arm and said head of said torque generating device.

8. The reaction device of claim 5, wherein a length of engagement area of said head of said torque generating device and said reaction arm is sufficiently large to ensure that all reactive torque forces generated by said torque generating device are transmitted onto said reaction arm.

9. The reaction device of claim 5, wherein at least some of the external surfaces of said head of said torque generating device engage internal surface of said reaction arm.

10. The reaction device of claim 1, further comprising a reaction arm including:
    a reaction bar; and
    a body portion including at least an internal female spline.

11. The reaction device of claim 10, wherein said body portion of said reaction arm wraps around said head of said torque generating device.

* * * * *